United States Patent [19]
Hershey et al.

[11] 4,058,927
[45] Nov. 22, 1977

[54] SNAG-FREE HYDRODYNAMIC FISHING SINKER CONTAINER

[75] Inventors: Virginia L. Hershey; George P. Hershey, both of McDermott, Ohio

[73] Assignee: The Raymond Lee Organization, Inc., New York, N.Y.

[21] Appl. No.: 713,342

[22] Filed: Aug. 11, 1976

[51] Int. Cl.$^2$ ............................................. A01K 95/00
[52] U.S. Cl. ................................... 43/43.13; 43/44.97
[58] Field of Search ................. 43/44.96, 44.97, 43.13, 43/43.14, 42.22, 43.1, 41.1, 42.4, 43.2

[56] References Cited

U.S. PATENT DOCUMENTS

| | | | |
|---|---|---|---|
| 2,801,491 | 8/1957 | Lawrence | 43/43.13 |
| 2,803,081 | 8/1957 | Nicholson | 43/43.13 |
| 2,817,923 | 12/1957 | Wertz | 43/43.1 |
| 2,884,734 | 5/1959 | Binkowski | 43/43.1 |
| 3,204,364 | 9/1965 | Beers | 43/44.96 |

*Primary Examiner*—Warner H. Camp
*Attorney, Agent, or Firm*—Howard I. Podell

[57] ABSTRACT

A shaped container has a fishing weight or sinker installed and a flat plate extends radially about a compartment in which the sinker is mounted. Holes in the plate provide optional mounting means for a fishing line passing through one of said holes and joined to the sinker in the container and to a fishhook leader extending externally away from the compartment. A fish hooked to the leader, in attempting to drag the sinker through weeds or rocks lying on the bottom of the water is drawn upwards by the reaction of the water against the flat plate, and away from the bottom.

1 Claim, 7 Drawing Figures

U.S. Patent      Nov. 22, 1977      4,058,927
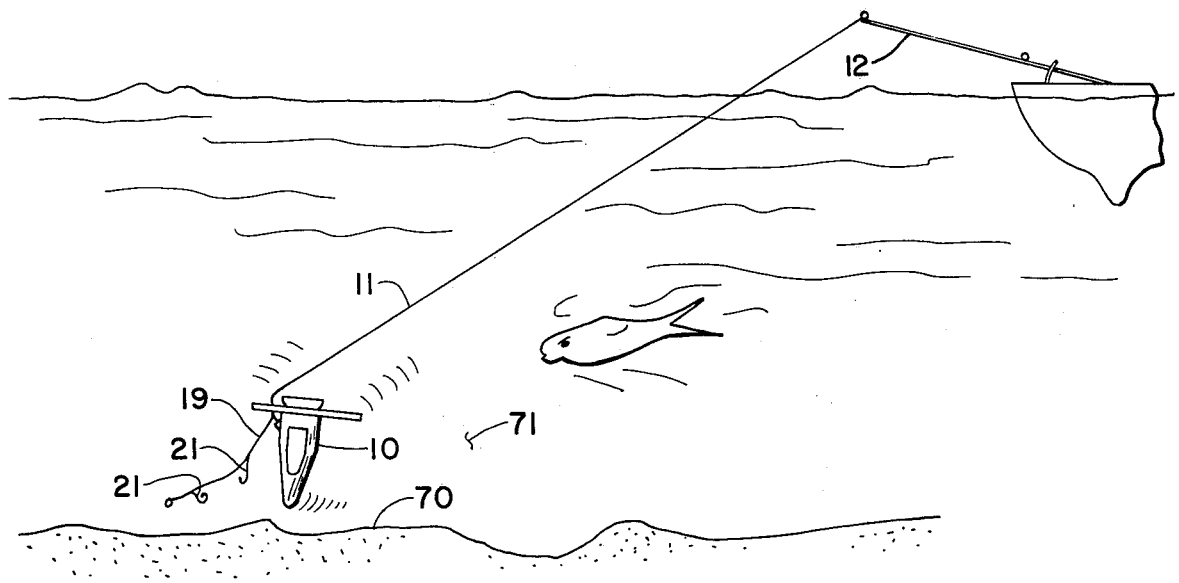
FIG. 1
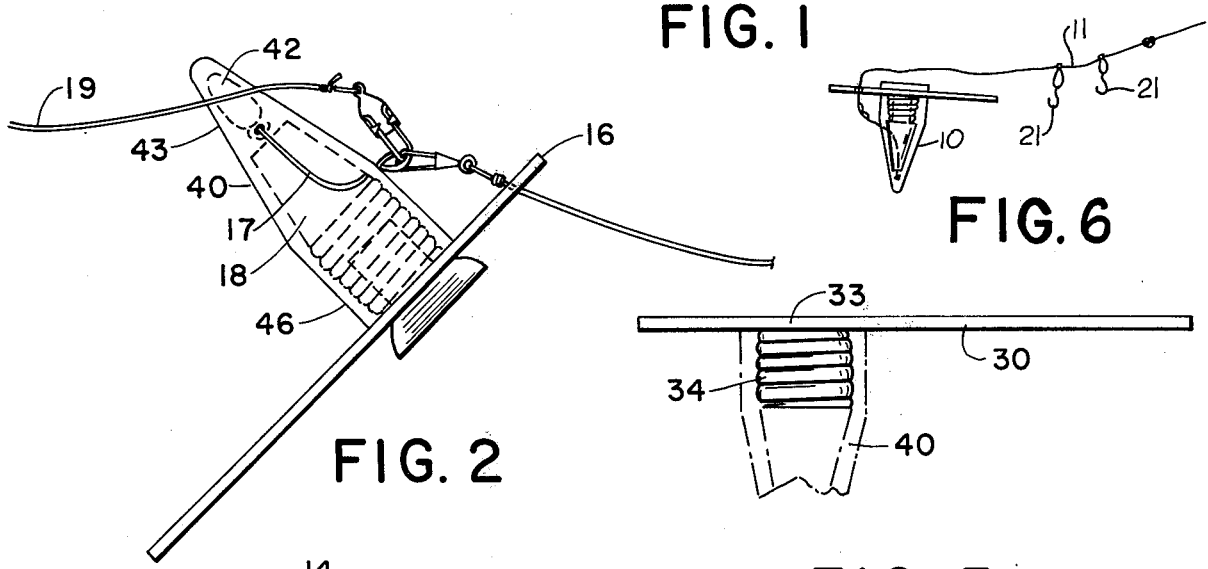
FIG. 2
FIG. 6
FIG. 3
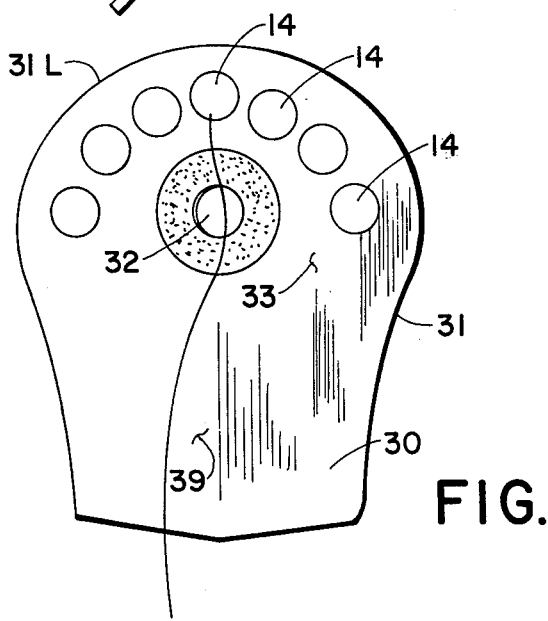
FIG. 4
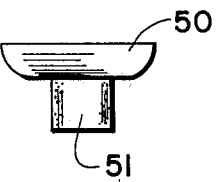
FIG. 5
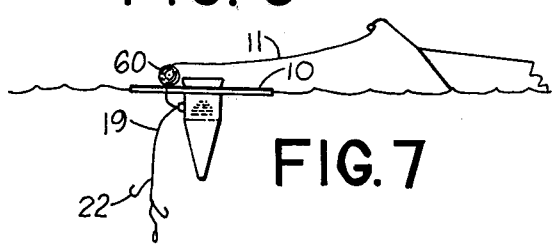
FIG. 7

SNAG-FREE HYDRODYNAMIC FISHING SINKER CONTAINER

SUMMARY OF THE INVENTION

Our invention is a shaped container in which a fishing weight or sinker may be installed fitted with a flat plate that extends radially about a compartment in which the sinker is mounted. Holes in the plate provide optional mounting means for a fishing line passing through one of said holes and joined to the sinker in the container and to a fishhook leader extending externally away from the compartment. A fish hooked to the leader, in attempting to drag the sinker through weeds or rocks lying on the bottom of the water is drawn upwards by the reaction of the water against the flat plate, and away from the bottom.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention in use;

FIG. 2 is a side view of the invention, illustrating a first alternate use;

FIG. 3 is a detail sectional view of the invention;

FIG. 4 is a plan view of the plate;

FIG. 5 is a side view of the plug;

FIG. 6 is a side view of the invention, illustrating a second alternate use; and FIG. 7 is a side view of the invention, illustrating a further alternate use.

DESCRIPTION OF THE PREFERRED EMBODIMENT

Turning now descriptively to the drawings, in which similar reference characters denote similar elements throughout the several views, FIGS. 1-2 illustrate the sinker container 10 with a fishing line 11 extending from a fishing rod 12 through one of several holes 14 in the plate 16 of the container to latch to both a line 17 extending into the container chamber 18, and to an external leader line 19 extending to one or more fishhooks 21.

The container 10 is formed of a flat plate 30 of irregular shape bounded by curved outer edges 31. A through hole 32 is mounted in the head section 33 of plate 30 and fitted on its underside with a male threaded collar 34 of a size to mate with a female thread in the sleeve section 46 of a hollow tapered cone unit 40. Cone unit 40 may be formed of transparent material which encloses a weight 42 embedded in the tip section 43 of the cone unit, with the tip unit 43 adjoining a hollow conical chamber 18 extending to the female threaded sleeve section 46 of the cone unit.

A plug 50 is fitted with a cork 51 of a size to plug through hole 32 and into interior chamber 18 of the attached cone unit 40.

A plurality of holes 14 are mounted radially in the head section 33 about hole 32 with the leading edge 31L of the plate 30 shaped as a convex arc segment extending away from hole 32.

The trailing end of edge 31 of the tail section 39 of plate 30 extends a greater distance from hole 32 than does the leading edge 31L, and tail section 39 is of reduced width than the width of head section 33.

In use, container 10 may be employed for bottom fishing, or for trolling purposes.

Chamber 18 and cork 51 furnish buoyancy to orient weighted tip downwards and maintain plate 30 at an angle to the horizontal plane in the resting position, while tension on fishing line 11 caused by a hooked fish causes plate 30 to plane in the water 71 at an upward angle to the horizontal towards the head end of the plate so as to cause the sinker cone tip 43 to rotate off the bottom 70 of the water 71, when fishing line 11 is located through a hole 14 to attach to sinker line 17 that projects externally of cone unit 40 and to a leader 19.

FIG. 1 illustrates the container 10 employed with the hooks 21 dangling from line 19 trailing below the container 10 for use when the bottom is covered with small rocks.

FIG. 2 illustrates a preferred method of use when trolling from a moving boat or when casting.

FIG. 6 illustrates a preferred method of use, when fishing on the bottom, with the hooks 21 fastened to the line 11 leading from the container 10 to the fishing rod 12.

FIG. 7 illustrates a method of utilizing the invention for surface fishing with a float 60 fastened to a hole 14 of the device to provide buoyancy.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A sinker for fishing purposes comprising
   a flat shaped plate,
   a conical unit fastened to the plate and projecting from a surface of the flat plate,
   a weight located in the conical unit, and
   fastening means to join the weight to the fishing line that extends through a hole in the plate,
   said conical unit fastened to the plate at a distance from the mid-line of the plate with a shorter section of the plate extending in one direction from the conical unit and a longer section of the plate extending in the opposed direction from the conical unit with the said hole in the plate located in the said shorter section of the plate, so that the longer section of the plate serves as a tail surface that orients in water along an upward plane when the plate is pulled by a fishing line extending through the hole in the shorter section.

* * * * *